United States Patent [19]
Hersch et al.

[11] Patent Number: 5,768,490
[45] Date of Patent: Jun. 16, 1998

[54] METHOD FOR PRODUCING VISUALLY EVENLY SPACED TYPOGRAPHIC CHARACTERS

[75] Inventors: Roger D. Hersch, Des Planches, Switzerland; Claude Bétrisey, Kirkland, Wash.

[73] Assignee: Ecole Polytechnique Fédérale Lausanne (EPFL), Lausanne, Switzerland

[21] Appl. No.: 723,468

[22] Filed: Oct. 9, 1996

Related U.S. Application Data

[62] Division of Ser. No. 43,180, Apr. 6, 1993, abandoned.

[51] Int. Cl.⁶ ............................................. G06F 3/14
[52] U.S. Cl. ..................... 395/168; 395/167; 395/780
[58] Field of Search ........................... 395/167, 168, 395/169, 170, 171, 172, 780; 400/9, 279; 345/141; 382/171, 177, 178

[56] References Cited

U.S. PATENT DOCUMENTS

| | | | |
|---|---|---|---|
| 4,591,999 | 5/1986 | Logan | 395/781 |
| 5,404,432 | 4/1995 | Koopman et al. | 395/790 |
| 5,410,647 | 4/1995 | Peaslee et al. | 395/167 |
| 5,432,890 | 7/1995 | Watanable | 395/781 |
| 5,513,277 | 4/1996 | Huttenlocher | 382/171 |
| 5,566,276 | 10/1996 | Muraishi | 395/110 |

*Primary Examiner*—Heather R. Herndon
*Assistant Examiner*—Stephen Hong
*Attorney, Agent, or Firm*—Joseph Page

[57] ABSTRACT

Methods are proposed for visually evenly spacing of two successive characters taking into account outline shape modifications induced by character grid-fitting. Visually even spacing of characters is obtained by converting the geometric space between two characters into its visually perceived equivalent space. Converting between geometric and visually perceived spaces requires transformations applied to the character outlines for smoothing out the character borders and replacing them by virtual borders which represent the boundaries of the perceived interchar-acter space. The optimal visual distance between the origins of two successive characters is obtained by requiring the characters to have a perceived visual space equal or close to an ideal perceived visual space called ideal optical inter-character space extracted from by design optimally spaced character pairs such as "nn" for lower-case characters and "HH" for capital letters.

7 Claims, 5 Drawing Sheets

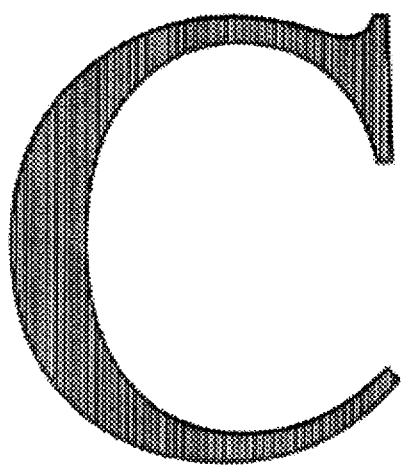
FIG. 2 a
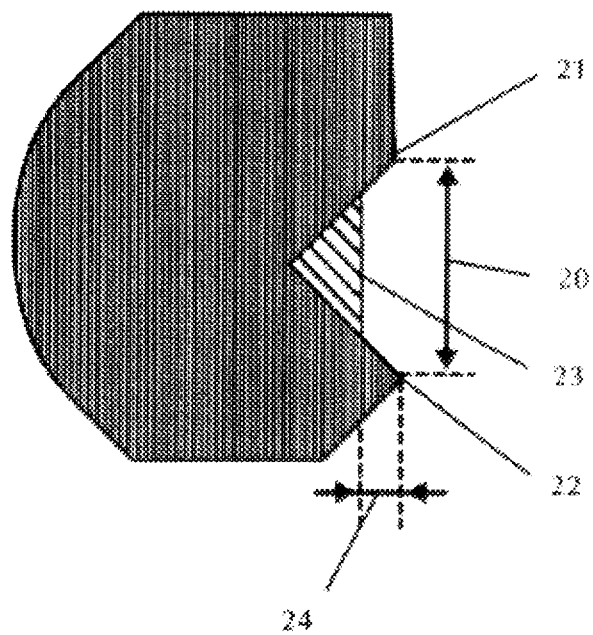
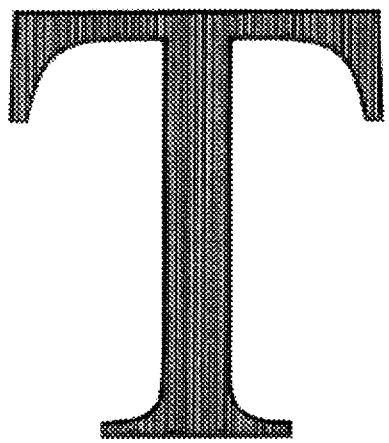
FIG. 2 b
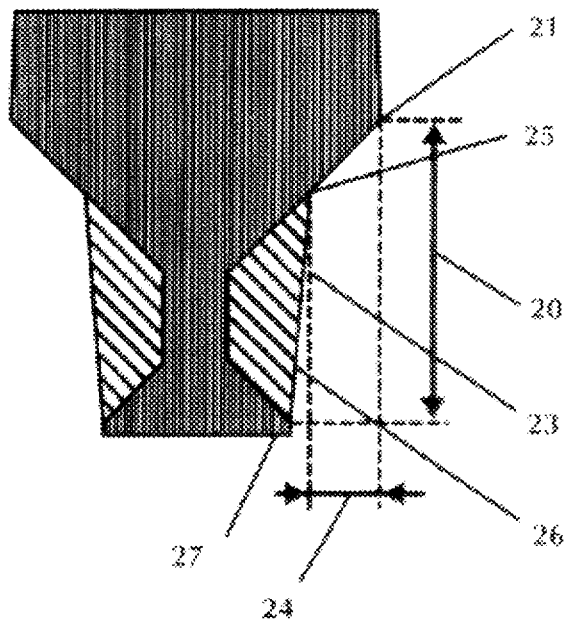

Wavelength
Wavelength
Wavelength
Wavelength
Wavelength
Wavelength

Wavelength
Wavelength
Wavelength
Wavelength
Wavelength
Wavelength

METHOD FOR PRODUCING VISUALLY EVENLY SPACED TYPOGRAPHIC CHARACTERS

This is a division of Ser. No. 08/043,180 filed Apr. 06, 1993, with title "Method For Producing Contrast-Controlled Grayscale Characters" abandoned.

BACKGROUND OF THE INVENTION

This invention relates to the art of synthesizing grayscale characters on variable intensity pixmap displays or printing devices. More specifically, it relates to the spacing of grid-fitted character representations at selectable resolution and point sizes, by using their scaled and grid-fitted outline description in order to compute the perceived visual space between two successive characters and to equalize it so as to produce visually evenly spaced characters.

The present invention is a divisional application from application Ser. No. 08/043,180, filing date Apr. 06, 1993 entitled "Method for producing contrast-controlled grayscale characters". It contains the description of a method for visually evenly spacing of successive grid-fitted characters such as the contrast-controlled grayscale characters produced according to the parent application Ser. No. 08/043, 180.

Previous methods for spacing characters use kerning techniques. Kerning in digital typography is the process of adjusting the spacing of letters pairwise. Each combination of letters needs to be considered for proper visual spacing. Spacing must be visually equal, which implies unequal geometric distance between letters. Kerning values stored in kerning tables specify for given pair of characters such as the "AV" character pair a positive or negative offset to be added to the normal character width of the first character of the pair. The book written by Richard Rubinstein "An Introduction to Type and Composition for Computer System Design" contains more information on state of the art spacing and kerning techniques. UK patent application GB 2'005'502A filed 20th Sep. 1978 entitled "Determining the spacing of characters", (D. G. Kindersley & N. E. Wiseman) describes a method of spacing characters where the lateral space to be occupied by a character is determined in accordance with the width of a canonical figure having the same sum of moments of area attributes as the character. Previous methods for spacing characters do not take into account the non-linear character deformations generated by the character outline grid-fitting process. This grid-fitting process (see for example parent application Ser. No. 08/043,180) enables generating high-quality bilevel or grayscale characters on low-resolution displays (CRT displays, LCD displays). The present invention enables grid-fitted characters such as the contrast-controlled grayscale characters produced by the method described in parent application Ser. No. 08/043,180 to be visually evenly spaced so as to provide a visually pleasant appearance.

SUMMARY

The present invention discloses a technique for computing the visually even space between two successive characters, direct neighbours in a line of text. The combination of high-quality character generation techniques such as the one disclosed in parent application Ser. No. 08/043,180 and visually even character spacing techniques produce high-quality text on displays and printers.

The new character spacing method described in the present divisional application produces visually evenly spaced characters. Visually even spacing of characters is obtained by converting the geometric space between two characters into its visually perceived equivalent space. Converting between geometric and visually perceived spaces requires transformations applied to the character outlines for smoothing out the character borders and replacing them by virtual borders which represent the boundaries of the perceived intercharacter space. The optimal visual distance between the origins of two successive characters is obtained by requiring the characters to have a perceived visual space equal or close to an ideal perceived visual space called ideal optical intercharacter space extracted from by design optimally spaced character pairs such as "nn" for lower-case characters and "HH" for capital letters.

Both the character contrast control technique for producing well contrasted and uniformly appearing grayscale characters (parent application Ser. No. 08/043,180) as well as the technique for producing visually evenly spaced characters (present divisional application) can be effectively used for devices such as displays, terminals, printers, photocomposers or communication equipment. Object of the present divisional application is a method for producing visually evenly spaced characters by computing the optimal visual distance between the origins of two successive character. Object of the present application is also a computer-based system for synthesising evenly spaced characters from grid-fitted ouline descriptions. The method comprises transformations which enable the visually perceived equivalent space between two successive characters to be generated from the geometric space between them. The method enables the computation of the optimal visual distance between two successive characters by equalizing their perceived visual space to the perceived visual space between two characters which have been by design visually evenly spaced such as the "nn" and "HH" character combinations.

These objects and other objects and features of the invention will best be understood from the detailed description of the invention.

FIGURES

FIGS. 2a and 2b show the details of the transformation described in FIG. 1d which limits the depth of the white space contributing to the perceived visual space.

FIG. 3a shows the complement of the visual space at the right of first character "c", called "complemented RightVisualSpace". FIG. 3b shows the visual space at the left of the second character "a" called "LeftVisualSpace". FIG. 3c shows the resulting visual space between the two characters.

FIG. 4 Shows the result of visually evenly spacing of grayscale characters.

FIG. 5 Shows the result of visually evenly spacing of bilevel characters.

Figure 6:
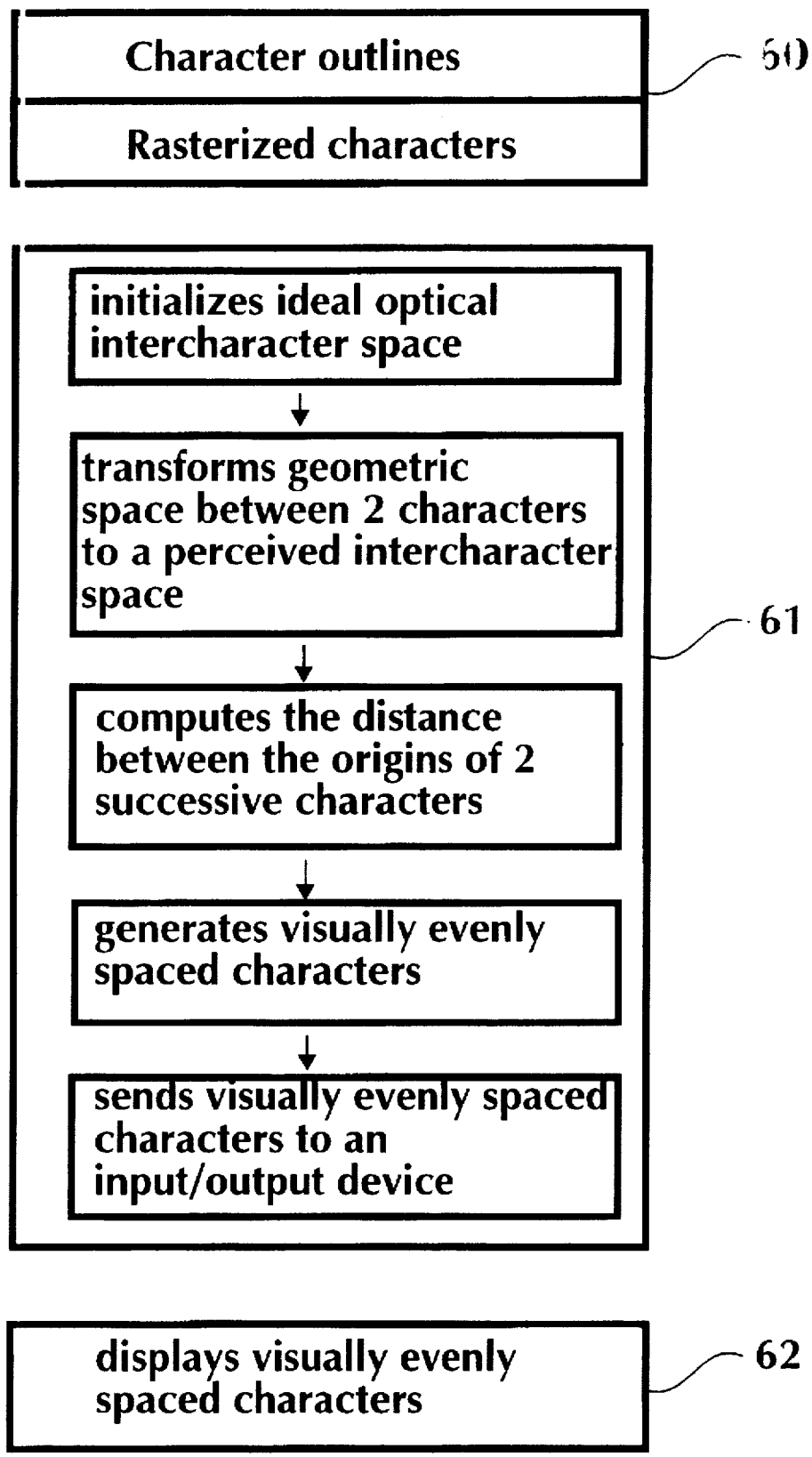

FIG. 6 Shows a computing system for synthesizing visually evenly spaced characters.

DETAILED DESCRIPTION

The display of contrast-controlled grayscale characters produces the best results if each individual character is adequatly rendered and, if necessary, stored as a character pixmap image for further use, and if the spacing between two successive characters is adapted to their respective shape combination, or, more precisely, to the perceived visual space between them. The contrast controlled rendering of individual grayscale characters (parent application Ser. No. 08/043,180) and the visually evenly spacing of two successive characters (present application) should be used jointly in order to achieve the best overall display quality. In the following description, the terms grayscale character and variable intensity character are interchangeable. Both terms refer to a character pixmap image, where the pixmap is composed of pixels having a given number of intensity levels, for example 4, 8, 16, 32, 64, 128 or 256 levels. Variable intensity characters can also be used to display color characters by using the variable intensity as an interpolation parameter for interpolating between a foreground colour and a background colour. The disclosed method can be applied to computers and terminals which display variable intensity characters so as to produce high-quality grayscale or colour characters. The method can also be applied to variable intensity dot printers which either print dots whose size depend on the intensity level of the pixels of the produced character pixmap image or which print dots whose density depends on the intensity level of the pixels of the produced character pixmap image.

The term grid-fitting means the process of adapting character outlines to the underlying grid, so as to obtain discrete bitmap or pixmap characters having uniformly looking character elements such as vertical bars, horizontal bars, stems and serifs (for more explanations, see R. D Hersch, C. Bétrisey, "Model-based Matching and Hinting of Fonts", Proceedings SIGGRAPH'91, ACM Computer Graphics, Vol 25, No 4, pp 71–80). The term grid-fitting is the general term for the adaptation of character outlines to the grid. The terms weight and phase control or contrast control specify a grid-fitting method specially tuned for producing perceptually-tuned grayscale characters as described in the parent application Ser. No. 08/043,180. The term "perceived visual intercharacter space" explained below has the same meaning as the terms "perceived visual space" or simply "visual space". The term "ideal optical intercharacter space" explained below has the same meaning as the term "ideal optical space". The "optimal spacing distance" between two successive characters is the integer spacing value specifying the distance between the origins of the two characters producing visually evenly spaced characters. Distances are generally given in pixel units, either as real numbers, or as integer numbers. One pixel unit is the distance between the centers of two neighbouring pixels, which are lying on the same horizontal scanline and have one common edge border. The target resolution grid is the grid used for displaying the characters, where one grid point or pixel represents one point of the target display, or in the case of a printer, one point of the target printer.

Visually Evenly Spacing of Characters

It is well known in the art that the best spacing between two characters depends on the shape of those characters and especially on the perceived visual space between both characters. Applying kerning techniques to text printed at high-resolution improves its quality. Due to the low-resolution of the considered display device and to the rendition of grayscale characters by weight and phase control, spacing between grayscale characters is critical. Using automatic kerning techniques substantially improves the quality of the displayed text by producing visually uniform spacing between characters. Any existing automatic kerning method may be used for computing the placement of characters at high resolution. We present here an original method for visually evenly spacing sucessive characters, which takes into account character shape variations due to grid-fitting and is therefore more accurate than a general-purpose size-independent automatic kerning technique. While the disclosed original spacing method is described in the context of grayscale character display, it can be also used for the spacing of grid-fitted bilevel characters, for general purpose character kerning, or as a method for automatically computing kerning values for character pairs.

Preferred Embodiment

The presently disclosed visually evenly character spacing method is based on a sequence of transformations which convert the geometric space between two grid-fitted successive characters into a space equivalent to the visually perceived space between the two successive grid-fitted character shapes. As a shorthand notation, the space equivalent to the visually perceived space is simply called "visually perceived space" or "visual space".

Converting the geometric intercharacter space to the visually perceived intercharacter space comprises transformations described below as transformations A, B, C and D. For the sake of the explanation, we assume that the background is white and that the displayed characters are black. The same transformations can be applied to characters of any color displayed on a background of any other color. These transformations are applied to the outlines of the characters which are spaced according to the present method. By transforming the character outlines, the geometric intercharacter spaces are converted into their corresponding visually perceived spaces. The terms "outlines", "contours" and "character borders" are used interchangeably.

Transformations A,B,C and D are successively applied to the character outlines.

Transformation A: Eliminate white space interior to the character shape as well as white space hidden behind vertical character elements (FIG. 1b) by projecting horizontal lines from the character boundary into the character.

Figure 1A:
FIGS. 1a, 1b, 1c, 1d, 1e show how successive transformations are applied to geometric character shapes in order to convert their respective geometric intercharacter spaces into their corresponding perceived visual spaces.
Figure 1B:
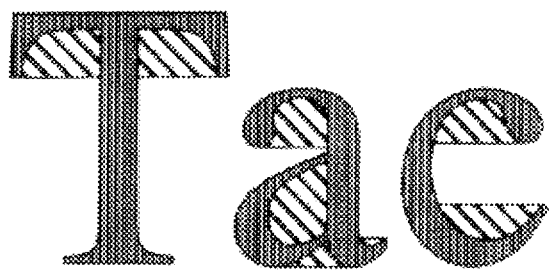
Figure 1C:
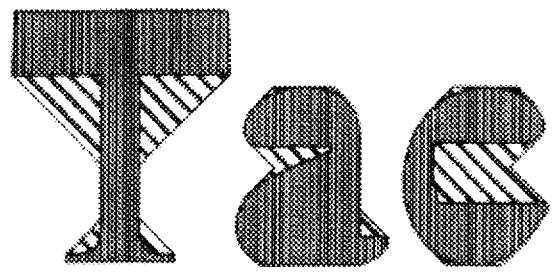

Transformation B: Limit interior white concavities to a surface bounded by 45 degrees oriented incident straight line segments (FIG. 1c).

Figure 1D:
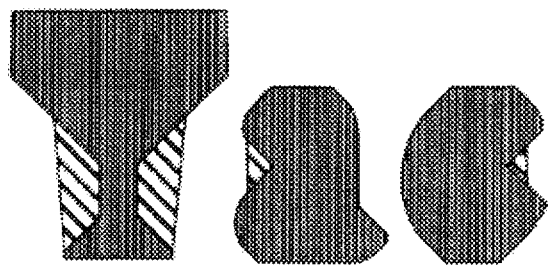

Transformation C: Limit the depth of the interior white space of cavities to a value proportional to the size of the cavity aperture (FIG. 1d).

Figure 1E:
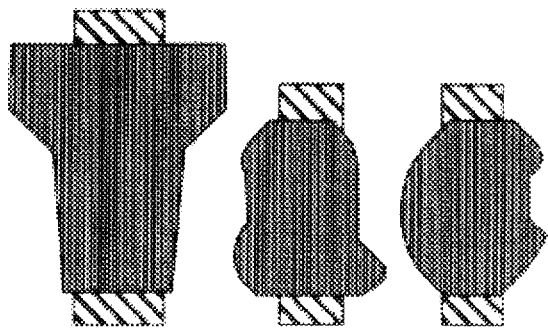

Transformation D: Limit the depth of the contributing white space to an absolute value given as a proportion of the character height, i.e. for capitals the caps-height and for lower-case characters the x-height (FIG. 1e).

The remaining space between two characters after transformations A, B, C and D is a value giving the amount of the visually perceived space between two characters. To produce uniformly spaced characters, the visual space computed in this manner is reduced or enlarged so that it equals an ideal optical intercharacter space given by the visual space between two characters which have been visually optimally spaced by a type designer. For latin characters, this can be the visual space between two successive characters "nn" for lower-case and "HH" for capitals. The amount of visual space reduction or enlargement divided by the height of the characters (caps-height for capitals, x-height for lower-case characters) gives a negative or positive kerning value which provides a means to improve character spacing.

In a preferred embodiment of a rendering-dependent visually evenly character spacing method, the pair of characters which has to be visually evenly spaced on the pixmap display first needs to be synthesized using the "weight and phase" contrast control character synthesizing techniques described in the parent application Ser. No. 08/043,180. This process leads to modified outline descriptions, where each character has its left reference placed at pixel boundaries. Processing steps A, B, C and D are successively applied to said modified outline description. Processing step A is straightforward: horizontal lines are drawn through local vertical shape extrema until the next contour intersection. Each horizontal segment between a local extremum and the next shape's intersection replaces its corresponding original concave outline shape part. Completely interior outline parts are eliminated and interior white space is thus removed (FIG. 1b).

Processing step B aims at prohibiting concave outline shape tangents from having absolute slope values smaller than 1. At any outline location of the character contour processed by step A having an outline shape part in the concave part of the character shape with an absolute tangent slope of 1, the corresponding tangent line with absolute slope 1 is drawn and intersected with the contour obtained by step A. The resulting tangential straight line segment having an angle of +45 degrees or −45 degrees with the horizontal replaces its corresponding contour shape part (FIG. 1c).

Processing step C (see FIG. 2a) limits the depth of the contributing white space to a value proportional to the cavity aperture 20, given by the vertical distance between the cavity's two horizontal maxima points 21 and 22. The cavity depth 24 is obtained by multiplying the cavity aperture by the DepthFactor parameter. Best results have been obtained with DepthFactor=0.21. A vertical line is drawn at a horizontal position given by the x-coordinate of the horizontal maximum with the largest value (point 22) minus (for a right border) or plus (for a left border) the computed cavity depth 24. The intersection of this vertical line with the shape contour obtained by processing steps A and B produces a vertical line segment 23 replacing corresponding contour shape parts. In case (FIG. 2b) the second horizontal maximum 27 has an x-coordinate positioned closer to the character's center of weight than the vertical line's x-coordinate, a straight line is drawn from the departure of the vertical line 25 to this second horizontal maximum 27. This straight line segment 26 replaces corresponding contour shape parts.

Processing step D gives a global depth limit to the contributing white space which is proportional to the character height:

$$GlobalDepthLimit = GlobalDepthParameter \cdot CharHeight$$

with CharHeight being the caps-height for capitals and x-height for lowercase characters. A good value for the GlobalDepthParamer is 0.25. Vertical lines located at the positions given by the shape's horizontal extrema minus (for a right border) or plus (for a left border) the GlobalDepth-Limit are drawn and intersected with the character shape. Corresponding exterior vertical line segments replace shape contour parts obtained by the previous processing steps (FIG. 1e).

Figure 3:
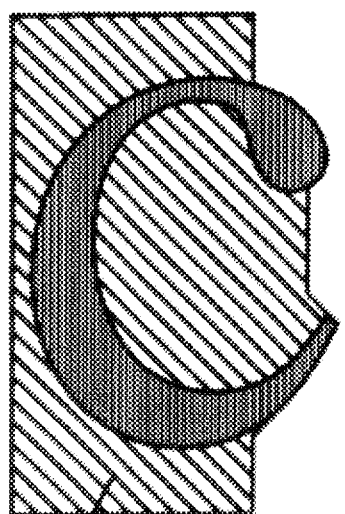
Figure 3:
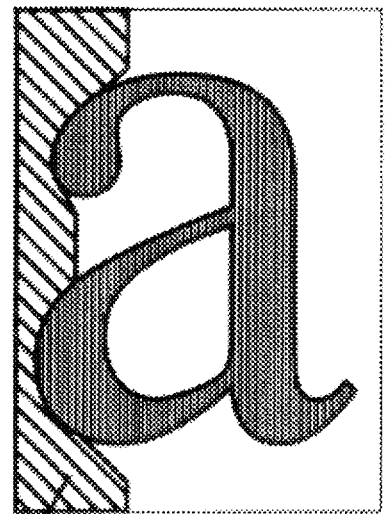
Figure 3:
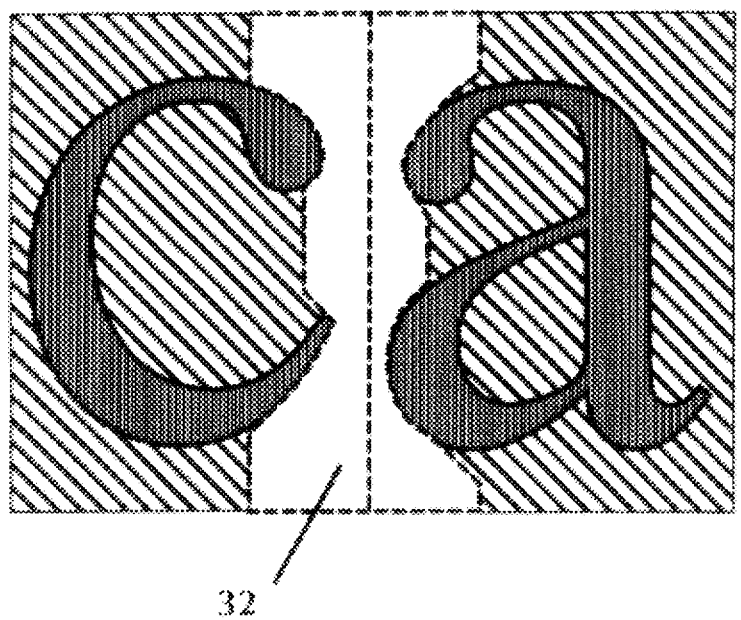

Each of the outline characters having been processed by steps A,B,C and D possesses a left and a right border. The space between the left reference line and the left border is the left visual space LVS (FIG. 3, 31). The space between the left reference line and the right border is the complemented right visual space CRVS (FIG. 3, 30). The ideal optical intercharacter space IOS is the value taken from the intercharacter visual space of two by design visually optimally spaced characters, such as the visually perceived intercharacter space of the "nn" character pair for lower-case and of the "HH" character pair for capitals. For spacing of character pairs composed of a capital and of a lower-case character, the mean value of the capital's ideal optical intercharacter space and that of the lower-case ideal optical intercharacter space is taken as the ideal optical intercharacter space IOS. The optimal visual distance OVD (1stChar,2ndChar) between the original of a first character and that of a second character is computed as follows:

$$OVD(1stChar,2ndChar) = \frac{CRVS(1stChar)}{CharHeight} + \frac{IOS}{CharHeight} - \frac{LVS(2ndChar)}{CharHeight} \quad (1)$$

where CharHeight is the caps-height for capitals, the x-height for lower-case characters and the mean value between caps-height and x-height for the ideal optical space value of a pair of characters composed by a capital and a lower-case character.

If necessary, the optimal visual distance OVD is increased in order to avoid parts of the two successive character shapes to overlap. For grayscale characters a minimal spacing value of 0.25 pixels is forseen between extrema located at similar vertical locations, for example between foot serifs. The new, if necessary increased, optimal visual distance OVD is rounded intelligently in order to have the left reference of the second character at a pixel boundary. Intelligent rounding means rounding the so-obtained optimal visual distance in the same way as the ideal optical intercharacter space IOS of two by design visually optimally spaced characters such as "nn" for lower-case characters and "HH" for capitals is rounded to produce the rounded optical intercharacter space. A resulting optimal visual distance OVD which is the same, up to a difference of +−25% of the interpixel distance, as the ideal optical character space IOS, will be rounded in the same way. Function Frac gives the fractional part of a real number. Here is a possible definition of such an intelligent rounding function:

$$IF\ 0.25 \leq Frac(IOS) < 0.5\ THEN\ Round(Value) := Trunc(Value+0.25)$$
$$ELSIF\ 0.5 \leq Frac(IOS) < 0.75\ THEN\ Round(Value) :=$$
$$Trunc(Value+0.75)\ ELSE\ Round(Value) := Trunc(Value+0.5). \quad (2)$$

The optimal visual distance Round(OVD) rounded in this manner gives the optimal spacing distance (OSVD) in pixels from the character origin of the first character to the character origin of the second character.

For generating kerning tables depending on the size of the rasterized pixmap character images, kerning values for each stored character pair are computed by subtracting the discretized width of the first character from the previously computed optimal spacing distance (OSVD). A discrete kerning value therefore gives the value which has to be added to the discrete width of the first character of two successive characters in order to obtain the space between the origin of the first character and the origin of the second character.

Let us enumerate the characterizing steps necessary for generating visually evenly spaced characters according to the present invention.

Step 1: Initialize an ideal optical intercharacter space (IOS) by looking up a geometric intercharacter space of two by design visually optimally spaced characters, by converting said geometric intercharacter space into a space equivalent to their perceived visual intercharacter space and by assigning said perceived visual intercharacter space to the ideal optical intercharacter space; Step 2: Compute an optimal visual distance (OVD) between the origins of two successive characters by converting their geometric intercharacter space into a space equivalent to their perceived visual intercharacter space and by computing the distance between the origin of the first character and the origin of the second character so as to make their perceived visual intercharacter space equal to the ideal optical intercharacter space.

Step 2 can simply be implemented by positioning successively the first and second grid-fitted outline characters according to the standard width value (real number) of the first character (W), by applying transformations to the outline characters in order to obtain the space equivalent to their perceived visual intercharacter space (PVS), and by computing a space reduction factor SRF=IOS/PVS. The optimal visual distance (OVD) is then obtained by multiplying the width W of the first character with the space reduction factor SFR $$OVD=(SRF\cdot W) \tag{3}$$

and by rounding the result in order to obtain the integer optimal spacing distance OSVD=Round (OVD).

However, in a prefered embodiment, formula (1) is used, since by introducing the notions of "complemented right visual space" (CRVS) and of "left visual space" (LVS), it is not necessary to position the two grid-fitted outline characters side by side according to the width W of the first character.

Computing System For Synthesizing Visually Evenly Spaced Characters

A computing system used to synthesize visually evenly spaced characters comprises a memory (60) for storing character outline descriptions and for storing rasterized bilevel or grayscale characters. The computing system also comprises a processing unit (61) operable for initializing the ideal optical intercharacter space by looking up the intercharacter visual space of particularly well designed and spaced character pairs such as "nn" for lower-case characters and "HH" for capitals, operable for transforming the geometric space between two characters to the corresponding perceived intercharacter space, operable for automatically computing the optimal visual distance between the origins of two successive grid-fitted outline characters by transforming the geometric space between the two grid-fitted outline characters into a space equivalent to the perceived visual space and by computing an optimal spacing distance which equalizes their perceived visual intercharacter space to the ideal optical intercharacter space, thereby generating visually evenly spaced characters and operable for sending said visually evenly spaced characters to an input-output unit for display purposes. The computing system further comprises an input-output unit capable of displaying characters (62) such as a cathode ray tube display (CRT), a liquid cristal display (LCD), a variable intensity dot printer or a variable dot size printer on which the visually evenly spaced characters are displayed, respectively printed.

Advantages of the Present Invention

The main advantage of the present invention is its ability to generate visually evenly spaced grayscale characters at any size and resolution. A further advantage of the invention is that the spacing is optimal in respect to the actual size of the considered pair of characters due to the fact that the perceived visual intercharacter space is computed after grid-fitting the character outlines. One further advantage resides in the fact that the spacing method works with grid-fitted character outlines and can therefore also be applied for spacing grid-fitted bilevel characters.

The techniques described in this invention apply mainly to devices producing grayscale and color character images such as displays and to devices producing character images with variable intensity dots such as printers and plotters having a variable dot size. They also apply to devices printing at two intensity levels such as binary displays and printers.

It will be appreciated from the preceding description that the invention can be used in a variety of applications to produce scalable typeface or character images, at any resolution and size. Additionally the invention can be used for various devices operable for producing characters, such as displays, terminals, printers, photocomposers or communication devices.

REFERENCES CITED

U.S. patent application Ser. No. 08/043,180, filing date Apr. 06, 1993 entitled "Method for producing contrast-controlled grayscale characters", applicants Roger D. Hersch, Claude Bétrisey, Justin Bur.

UK patent application GB 2'005'502A filed 20 Sep. 1978 entitled "Determining the spacing of characters", (D. G. Kindersley & N. E. Wiseman)

Richard Rubinstein, An Introduction to Type and Composition for Computer System Design, Addison-Wesley, Mass, 1988

R. D. Hersch, C. Bétrisey, "Model-based Matching and Hinting of Fonts", Proceedings SIGGRAPH'91, ACM Computer Graphics, Vol 25, No 4, pp 71–80

What we claim is:

1. A method for producing visually evenly spaced characters, the method comprising the steps of:

a) initializing an ideal optical intercharacter space by looking up a geometric intercharacter space of two by design visually optimally spaced characters, by converting said geometric intercharacter space into a space equivalent to their perceived visual intercharacter space and by assigning said perceived visual intercharacter space to the ideal optical intercharacter space; and b) automatically computing an optimal visual distance between the origins of two successive characters by converting their geometric intercharacter space into a space equivalent to their perceived visual intercharacter space and by computing the distance between the origin of the first character and the origin of the second character so as to make their perceived visual intercharacter space equal to the ideal optical intercharacter space, where converting a geometric intercharacter space into a space equivalent to a perceived visual intercharacter space comprises the steps of:

i) eliminating white space interior to the characters as well as white space hidden behind vertical character elements by projecting horizontal lines from the character boundary into the character;

ii) limiting white interior concavities by intersecting each concavity with two tangents to the contour of the characters having an absolute slope of 1;

iii) limiting the depth of white cavities by a value proportional to the cavity aperture; and iv) limiting the global depth of white cavities to a value proportional to the characters' height.

2. The method of claim 1 whereby computing the visually optimal distance between the origin of the first character and the origin of the second character so as to make their perceived visual intercharacter space equal to the ideal optical intercharacter space comprises the step of computing an optimal visual distance OVD between the origin of the first character and that of the second character using the formula:

$$OVD(1stChar, 2ndChar) = \frac{CRVS(1stChar)}{CharHeight} + \frac{IOS}{CharHeight} - \frac{LVS(2ndChar)}{CharHeight},$$

where the space between the left reference line and the left border is the left visual space LVS, the space between the left reference line and the right border is the complemented right visual space CRVS, CharHeight is the character height, which is a value selected from the group consisting of xheight, caps-height and the mean between x-height and caps-height and where IOS is the ideal optical intercharacter space.

3. The method of claim 2 where the optimal visual distance OVD is rounded in the same way as the ideal optical intercharacter space, thereby generating the optimal spacing distance in pixels between the character origin of the first character and the character origin of the second character.

4. The method of claim 2, whereby after the computation of the optimal visual distance OVD an additional step is inserted where possible overlaps between character parts of the two characters are checked and where the optimal visual distance OVD is increased by the amount of overlap plus a small spacing value less than one pixel at the target resolution grid.

5. A method for producing visually evenly spaced characters, the method comprising the steps of:
   a) initializing an ideal optical intercharacter space by looking up a geometric intercharacter space of two by design visually optimally spaced characters, by converting said geometric intercharacter space into a space equivalent to their perceived visual intercharacter space and by assigning said perceived visual intercharacter space to the ideal optical intercharacter space; and
   b) automatically computing an optimal visual distance between the origins of two successive characters by converting their geometric intercharacter space into a space equivalent to their perceived visual intercharacter space and by computing the distance between the origin of the first character and the origin of the second character so as to make their perceived visual intercharacter space equal to the ideal optical intercharacter space;

where converting between geometric and visually perceived intercharacter spaces requires transformations applied to the character's outlines for smoothing out the character's borders and replacing them by virtual borders which represent the boundaries of the perceived visual intercharacter space.

6. A computing system for synthesizing visually evenly spaced characters from grid-fitted character outline descriptions comprising:
   a) a memory for storing character outline descriptions and for storing rasterized characters;
   b) a processing unit operable for initializing an ideal optical intercharacter space by looking up an intercharacter visual space of a particularly well designed and spaced character pair, operable for transforming a geometric space between two successive characters to a perceived intercharacter space by transforming the characters' outlines, smoothing the characters' borders and replacing them by virtual borders which represent the boundaries of the perceived visual intercharacter space, operable for automatically computing a distance between the origins of two successive characters by making use of the grid-fitted character outline descriptions of both characters, thereby generating visually evenly spaced characters and operable for sending the visually evenly spaced characters to
   c) an input-output unit operable for displaying the visually evenly spaced characters.

7. The computing system of claim 6, where the input-output unit is a device selected from the group of liquid crystal displays, cathode-ray tubes, variable intensity dot printers and variable dot size printers.

* * * * *